United States Patent [19]

Hoffman

[11] Patent Number: 5,261,102
[45] Date of Patent: Nov. 9, 1993

[54] SYSTEM FOR DETERMINING DIRECT AND INDIRECT USER ACCESS PRIVILEGES TO DATA BASE OBJECTS

[75] Inventor: Richard D. Hoffman, Austin, Tex.
[73] Assignee: International Business Machines Corporation, Armonk, N.Y.
[21] Appl. No.: 678,572
[22] Filed: Mar. 28, 1991
[51] Int. Cl.$^5$ .......................... G06F 15/401
[52] U.S. Cl. ................ 395/700; 380/25; 340/825.31; 364/DIG. 1; 395/600
[58] Field of Search .......... 364/DIG. 1, DIG. 2; 395/600, 700; 380/4, 25; 340/825.31, 825.34

[56] References Cited

U.S. PATENT DOCUMENTS

| | | | |
|---|---|---|---|
| 4,249,241 | 2/1991 | Aberle et al. | 364/200 |
| 4,325,120 | 4/1982 | Colley et al. | 395/375 |
| 4,956,769 | 9/1990 | Smith | 395/600 |

Primary Examiner—Thomas C. Lee
Assistant Examiner—Paul Lintz
Attorney, Agent, or Firm—Sprung Horn Kramer & Woods

[57] ABSTRACT

A method and computer system are disclosed for determining the access privileges currently held by a database user with respect to objects in the database. The steps of the method are: (a) requesting a determination of those objects to which a given user has access privileges; (b) automatically determining those objects to which the user has direct access privileges; and (c) automatically determining those objects to which the user has indirect access privileges. This last step (c) is accomplished by (1) automatically determining all access groups to which the user belongs; and (2) automatically determining those objects to which those access groups, determined in step (1), have access privileges.

38 Claims, 3 Drawing Sheets

SYSTEM FOR DETERMINING DIRECT AND INDIRECT USER ACCESS PRIVILEGES TO DATA BASE OBJECTS

BACKGROUND OF THE INVENTION

The present invention relates to a method for determining the access privileges currently held by a database user with respect to objects in the database. More particularly, the present invention relates to a product-independent method for automatically determining such privileges and for displaying (1) the names of the objects to which the user has access privileges, (2) an identification of the type of access to each object to which the user has access privileges, (3) an identity of the associated access group through which the user has access privileges and (4) an indication as to whether or not such access privileges may be extended to others.

It is currently quite difficult for a database user to determine those objects to which he or she has access privileges. A given user may have "direct access" to a database object, for example by virtue of having created the database object or, "indirect access" to the database object by virtue of membership in a group or class which has access to that object. As a special case of this category, a database user always has access to those database objects which are generally accessible.

As used herein, the term "access privileges" is intended to mean any type of access to a database object. Such access may include, by way of example and not limitation, the ability to view an object; to modify an object, e.g., by changing numbers in a table; to alter an object, e.g., by changing the object's structure; and to delete all or part of an object. The formal types of access privileges have been standardized in different database management systems and are well known to those skilled in the art.

The term "direct access" is intended to include those types of access privileges which a user has without reference to a group or class. These privileges are typically granted directly to a user by the owner of the object to be accessed or by a specially privileged administrator.

The term "indirect access" includes all types of access which are not direct. Public access is a type of "indirect access" as is access through membership in a defined group or class. For example, the personnel department in a corporation may be granted access to certain database objects (e.g., confidential personnel files) to which no one else in the corporation has access. Corporate employees who join and later leave the personnel department will be members of this group during their tenure, and will thus have temporary access to the personnel files.

Groups are therefore "pseudo entities" with prescribed access privileges to certain database objects. These groups are treated in the database as if they were actual users.

A given database user may be a member of several groups within an organization. For example, the Director of Personnel may be a member of the personnel group, as well as a member of a high level management group within the corporation. It is not unusual, therefore, for a database user to be unaware or uncertain of all the groups to which he or she belongs for purposes of access within a database. Since the grouping itself is normally stored outside the database, the user may not even have access to information about all the possible groups and to the access privileges of each group.

Consequently, it is extremely difficult for a user to determine all of the database objects to which he or she has access privileges. A given user would probably know those database objects which he or she created and owns, but perhaps not if these objects were numerous or were created over a long period of time. A user may also be aware that he or she is a member of at least one group; however, he or she may not know all of the groups to which he or she belongs, not to mention the access privileges of all such groups.

Currently, therefore, a user would find it difficult, if not impossible to determine and display all of those objects to which he or she has access privleges, together with the types of privileges for those objects.

All of the information required by a user to determine his or her access privileges is, in fact, available somewhere in the system. However, to obtain this information the user must submit a number of queries against the system catalogues as well as against the database itself. Some of the necessary information, such as the effect of security group membership, is not normally available without a security code.

Used throughout the specification are a number of additional terms that require definition. These definitions are set forth below:

A database "object" is a set of data within a database which is arranged in a particular way. For example, this set of data may be a "table" or a "view".

A "table" is a set of data arranged in rows and columns.

A "view" is a logical subset of an object which is accessible to a user. For example, a view of a table may contain all the rows of the table except one.

A "collection" is a set of objects within a database. These objects may, for example, relate to a common subject.

A "package" is a set of pre-processed commands that can be run against a database.

An "index" is an underlying object within an object. An index to a table forms part of the table.

A "snapshot" is a copy of a table or view at a specific moment in time. For example, a snapshot may be taken of a table once per day, although the current table is continuously changing.

An "rdb" is an acronym for "relational database".

An "alias" is a nickname for an object in the database. For example, the official name of a table may be "2734.5" which is difficult for a user to remember. The user may therefore give the table an alias such as "mytab".

At the present time the OS/2 Query Manager (QM) requires that access privilege determination be available for tables and views in the ASP-1 time frame. To do this, QM presents database users with menus of tables from which they may select. The IBM Common User Access (CUA) specifications require that these menus display only tables which the user may access. This guideline is derived from industry and international standards and is a response to recent human engineering studies. Currently, QM obtains this information from special function calls which work only for OS/2.

SUMMARY OF THE INVENTION

A principal object of the present invention is to provide a method for determining the access privileges currently held by a database user with respect to objects in the database.

Another object of the present invention is to provide a method of the aforementioned type which is "product independent"; that is, which can be imported to any database management program product.

A further object of the present invention is to provide a method of the aforementioned type which prevents access by the user to the identification of those tables to which the user does not have access privileges.

A further object of the present invention is to provide a method of the aforementioned type which is implemented in a non-procedural computer language for use with a plurality of database program products.

These objects, as well as further objects which will become apparent from the discussion that follows, are achieved, according to the present invention, by a method comprising the steps of:

(a) requesting a determination of those objects to which a given user has access privileges;

(b) automatically determining those objects to which a user has direct access privileges; and (c) automatically determining those objects to which a user has indirect access privileges by means of the steps of:

(1) automatically determining all access groups to which a user belongs; and (2) automatically determining those objects to which the access groups, determined in step (1), have access privileges.

To determine the access privileges with respect to a particular single object in the database, a similar method may be employed. In this case, the method comprises the steps of:

(a) requesting a determination of whether the user has access privileges to the given object;

(b) automatically determining whether the user has direct access to the object; and (c) automatically determining whether the user has indirect access to the object by means of the steps of:

(1) automatically determining all access groups to which the user belongs; and (2) automatically determining whether one or more of the access groups, determined in step (1), have access privileges to the object.

The access privileges information, so obtained, may be either displayed to the user—for example, by either a monitor or a print out—or this information may be used directly in some other way. For example, rather than displaying the access privileges, these privileges may be used as an authentication mechanism, giving the user direct access to the objects he or she specifies. Alternatively, the information can be used for statistical purposes or some other administrative purpose not requiring a direct display of the user's privileges.

Previously, in order to obtain this same access privileges information, a user was required to determine the groups to which he or she belonged and then determine what objects these groups had access to. This second step required a query on a catalog which had a list of all people and groups having access to each object in the database, together with the type of access. Since such catalogs do not include a list of the people in each group, a separate determination had to be made of this fact through a query against the group management utility (outside the database).

The present invention automates this process and assures that the user is not allowed to see a list of all the objects in a database through viewing the catalogue.

According to a particular feature of the present invention, the method also determines automatically those objects to which the public has access privileges, thereby including these objects among the list of those objects to which the user has direct access and indirect access.

According to another feature of the present invention, the step of requesting a determination of the user's access privileges may include the steps of:

(1) issuing a command to describe the access privileges;

(2) stating the type of object to be described;

(3) stating the name of the object to be described; and (4) stating the name of a control block that will receive the access privileges information.

When access privileges to an object are granted through an access group, the respective access group is preferably displayed together with the object.

According to a still further feature of the present invention, the type of access to each object to which the user has access privileges is displayed along with the respective object. Such type of access may, for example, include "select", "insert", "update", "delete", "drop", "alter", "index" and "reference" access. These access types are well defined and recognized in the art.

A further preferred feature of the present invention includes the step of determining whether the access privileges, for each object to which a user has access privileges, may be extended to others. This information may be displayed, or otherwise utilized by the user, at the user's option.

According to another particular feature of the present invention, the method is implemented in a non-procedural computer language such as Structured Query Language (SQL). Alternatively, the method may be implemented in an Application Programming Interface (API). The use of SQL permits the method to be imported to any database management product.

The method and features described above are implementable by suitable program code designed to be run on a computer system. Such program code and computer system are intended to be encompassed by the present invention.

The preferred embodiment of the present invention will now be described with reference to the accompanying drawings.

DESCRIPTION OF THE PREFERRED EMBODIMENT

General Description

The preferred embodiment of the present invention will now be described with reference to FIGS. 1-5 of the drawings.

Figure 1:
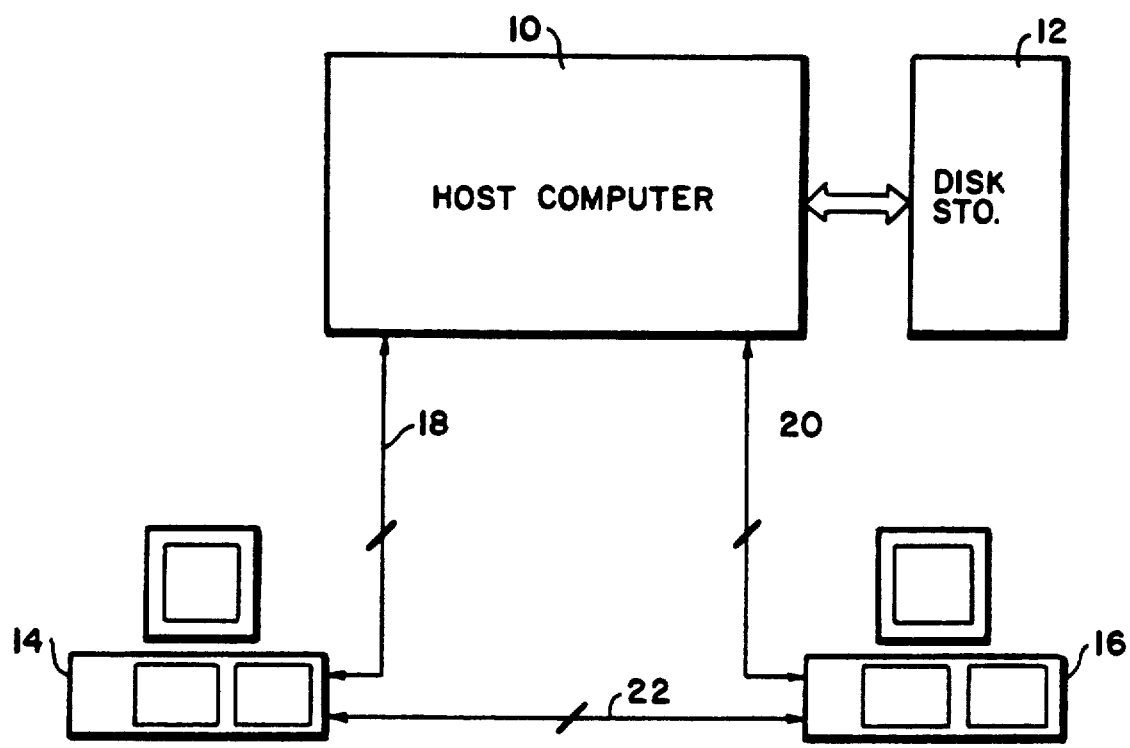
FIG. 1 is a block diagram showing a small computer system comprising a host computer and two personal computers.

FIG. 1 shows the general computer hardware environment of the present invention. The present invention may be resident on a single personal computer, two or more personal computers connected together to exchange information or, as shown in FIG. 1, two or more personal computers connected together and to a host computer such as an IBM 370 system. FIG. 1 illustrates a host computer 10 which operates with a large disk storage file 12. A first personal computer 14 and a second personal computer 16 are connected to the host computer 10 via multiple lines 18 and 20, respectively, which carry data and control information. The two personal computers are also connected together via data and control lines 22.

Figure 2:
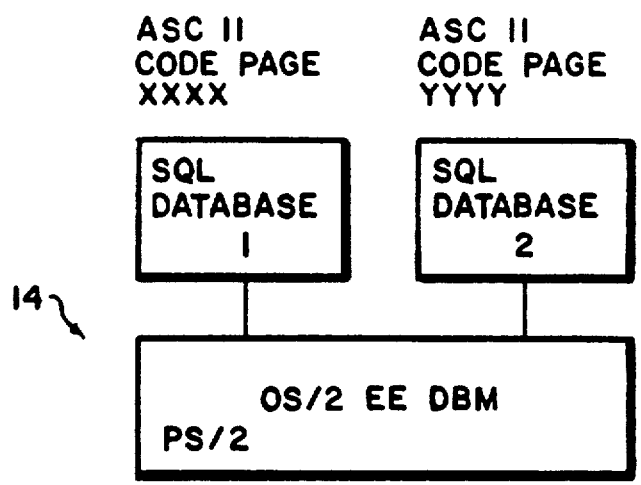
FIG. 2 is a block diagram of a personal computer system using an operating system that supports a database manager and two separate databases.

The database environment of the present invention can take the form illustrated in FIG. 2. In this case, the PS/2 TM personal computer operates with an OS/2 Extended Edition TM Database Manager adaptation of the Integration Exchange Format (IXF) data interchange software that enables the exchange of relational table structures and data. The character data is stored in one or more databases in a specific codepage environment such as IBM's ASCII codepage 437. Numeric and date/time data are stored internally in a format that the underlying operating system and/or hardware supports.

Specifically, the Database Manager is a database management system (hardware and software) that supports a relational database model in which all data is viewed as a collection of tables. The Database Manager provides a relational command processor called "Database Services"; a generalized query system for locating data; a system for import and export of data from and to another computer system; and a system for backup and restoration of an individual relational database table, and for maintenance.

The Database Services is the relational command processor of the Database Manager. It serves a large number of functions which include: a system for storage access; Structured Query Language (SQL) statement processing; database management; lock management; concurrency control; write-ahead logging; recovery services, row-level locking granularity; data recovery in the event of application, system, or record medium failure; and security control. Both the Database Manager and Database Services are well known applications for the PS/2 computer and need not be described in detail.

Figure 3:
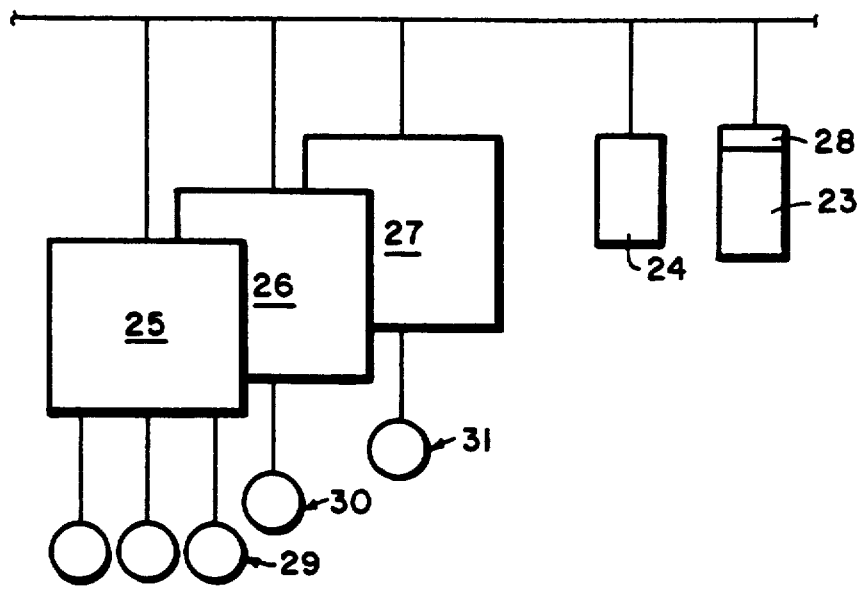
FIG. 3 is a representational diagram showing a number of objects contained in a database.

FIG. 3 illustrates a typical database comprising individual objects 23 and 24 and groups or collections of objects 25, 26 and 27. By way of example, the object 23 is provided with an index 28, whereas the object 24 has no index. The collections 25-27 each comprise a plurality of objects 29, 30 and 31, respectively.

Figure 4:
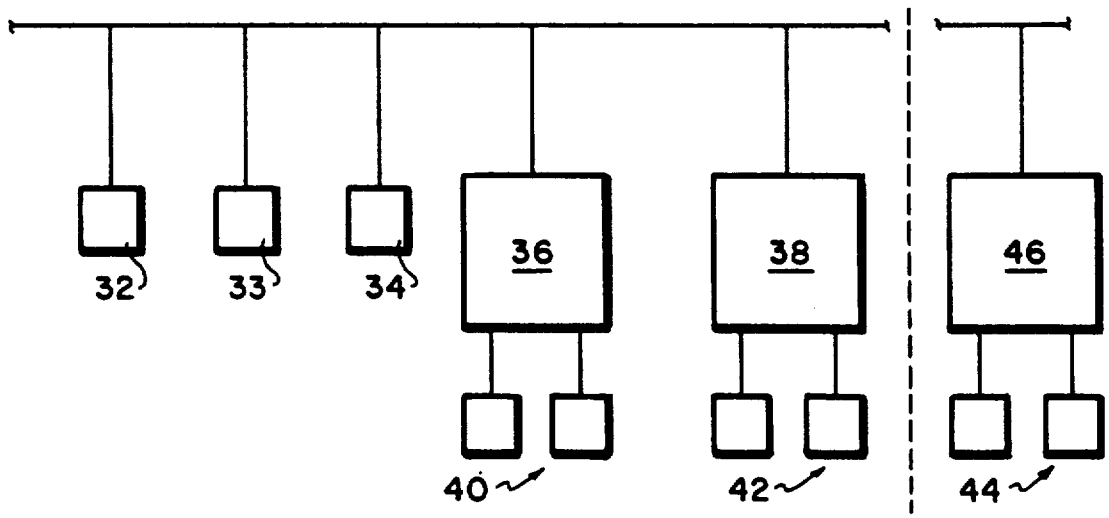
FIG. 4 is a representational diagram illustrating user access to a database.

Various types of access to a given object are obtained by the universal set of users illustrated in FIG. 4. Access to a database object may be direct, as is illustrated with respect to users 32, 33 and 34, or indirect, as is illustrated by the groups 36 and 38 and their respective member users 40 and 42. Alternatively, public access to the object may be provided to all users 44 through the public access "group" 46.

Figure 5:
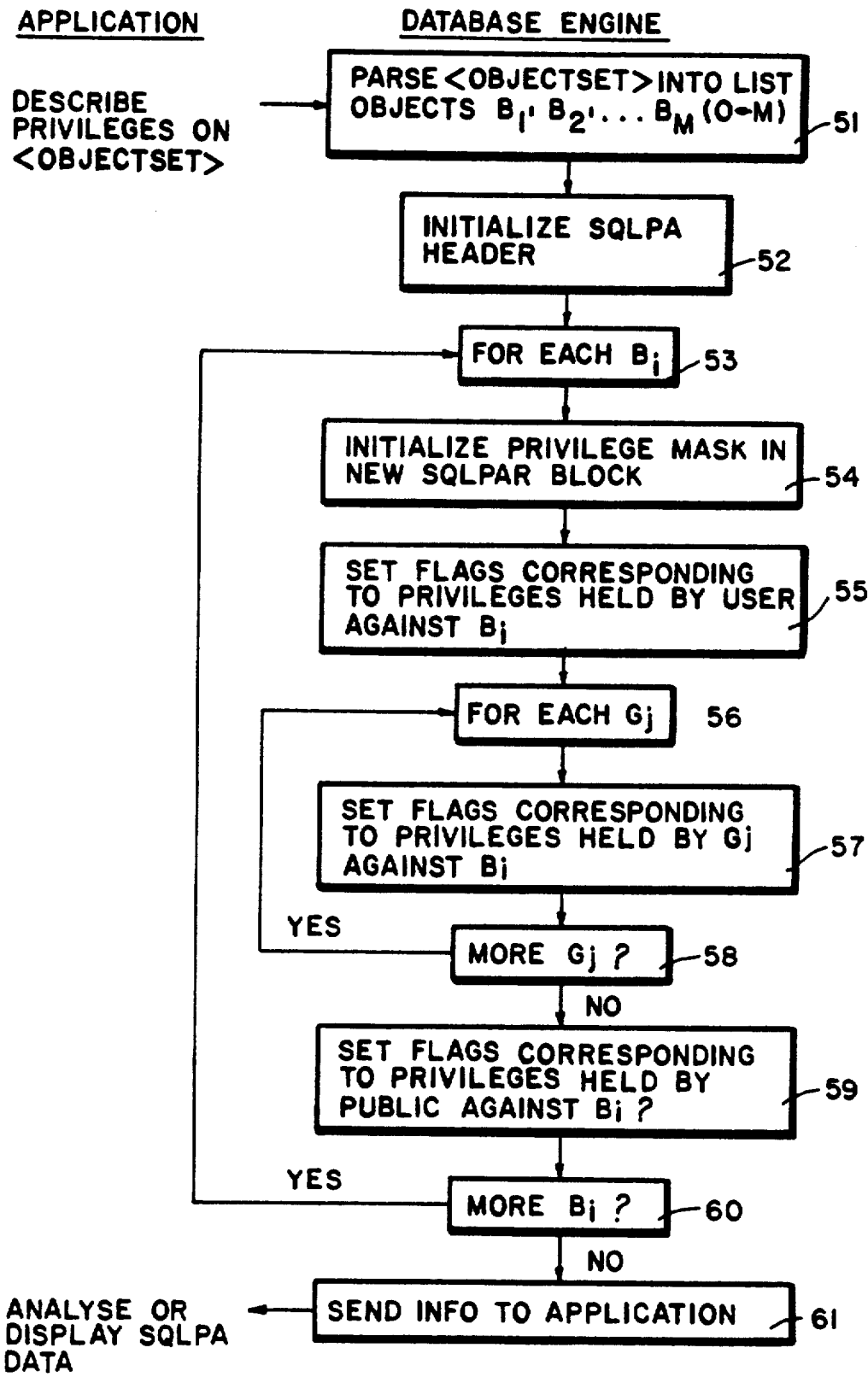
FIG. 5 is a flow chart of an algorithm for implementing the method according to the present invention.

FIG. 5 is a flow chart showing way in which a programming instruction "DESCRIBE PRIVILEGES" may be executed within a computer. With this algorithm it is assumed that, at the time of initialization, the database has access to the following information:

(1) The log-in ID of the user running the current application; and (2) The groups $G_1, G_2 \ldots, G_j \ldots, G_N$ ($0 \leq N$) to which the user belongs.

Upon receipt of the instruction DESCRIBE PRIVILEGES on <object set>, the database engine parces <object set> into a list of the objects $B_1, B_2 \ldots, B_i, \ldots, B_M$ ($0<M$) (block 51). Thereafter, the program initializes a header (block 52) and enters a loop to successively look at each object $B_i$ (block 53). In the loop, a privilege mask is initialized (block 54) and the flags corresponding to privileges held by the user against the current object $B_i$ are set (block 55).

The program next enters a loop to consider each of the groups $G_j$ to which the user belongs (block 56). For each group, the flags corresponding to privileges held by that particular group against the current object $B_i$ are set (block 57). When all the groups have been reviewed (block 58) the flags corresponding to privileges held by the public against the current object $B_i$ are set (block 59). When all the objects have been considered (block 60), the information defined by the set flags are sent to the applications program (block 61). This data may be displayed by the applications program or analyzed, as desired.

Implementation in SOL

A specific implementation of the present invention in Structured Query Language (SQL) will now be described. SQL is a well known non-procedural language which may be used with many database products.

The DESCRIBE PRIVILEGES instruction statement in SQL obtains information about privileges currently held by the executor of the statement at the current database instance (i.e., the database instance listed in the CURRENT SERVER special register).

As used hereinafter the term "primary authorization-id" is intended to mean the value of a special register "USER". A "secondary authorization-id" is an authorization-id which is used in addition to the primary authorization-id in determining privileges when data manipulation language is executed. The "active authorization-id" is the authorization-id of the user executing the statement. This is either the value of a SQLID special register, for those products which support it, or the value of USER. "The authorization-id of the statement" refers to none of the above, but rather to the authorization-id under which the DESCRIBE PRIVILEGES statement was bound. Finally, a "collection-id" is an identifier used as the middle part of a three-part object name.

The DESCRIBE PRIVILEGES statement can only be embedded in an application program. It is an executable statement that cannot be dynamically prepared. The privileges held by the authorization-id of the statement must include the administrative authority.

The DESCRIBE PRIVILEGES statement has the following form:

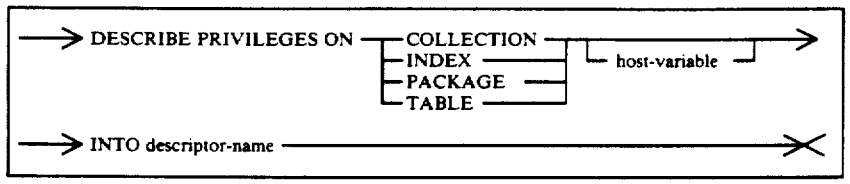

In this statement "ON" identifies the type of object which will be described. The options preferably include the following:

(1) COLLECTION: Privileges on collections will be described.

(2) INDEX: Privileges on indexes will be described.

(3) PACKAGE: Privileges on packages will be described.

(4) TABLE: Privileges on tables, views and snapshots will be described.

In the DESCRIBE PRIVILEGES statement the "host-variable" identifies the objects on which privileges will be described. The value of host-variable is a string of characters having a form shown in the following Table 1, left-justified within the host variable and containing no blanks, except for those within delimited identifiers. If the length of the name is less than the length of the variable, the last character of the name is followed by a blank. The default value is "*". The term "rdb" in the table stands for "relational database".

The host variable is described in the calling program under the rules for declaring character string variables; an indicator variable is not required to be specified.

TABLE 1

| Valid forms for object specification | |
|---|---|
| Form | Meaning |
| If the ON clause does not specify COLLECTION | |
| rdbname.collection-id.object-name collection-id.object-name object-name | A single object (table or view, index, package, or snapshot), or alias of an object. |
| rdbname.collection-id.* collection-id.* * | All the objects of a given type whose middle qualifier is a particular collection-id. |
| rdbname.*.* *.* | All the objects of a given type in the database instance. |
| If the ON clause specifies COLLECTION | |
| rdbname.collection-id collection-id | A single collection. |
| rdbname.* * | All collections in the database instance. |

In each form, if rdbname is specified, it is the name of the current database instance (that is, the value of CURRENT SERVER). If rdbname is not specified, it is taken to be the name of the current database instance.

If collection-id is not specified, and the object type is not COLLECTION, collection-id is taken to be the execution-time value of CURRENT COLLECTION, if supported, or the execution-time value of USER, otherwise.

"INTO" names an SQL Privileges Area (SQLPA). When the DESCRIBE PRIVILEGES statement is executed, values are assigned to the fields of SQLPA according to the Tables 2-4 which follow.

The names used to identify the fields in the tables need not be the names used in programs to refer to these fields. However, they are the names which are used in the structures created by INCLUDE SQLPA, except that in the programming language "C" the names will be in the lower case.

TABLE 2

SQLPA Description.
Values for these fields are assigned by the system, except for the SQLPAN field, which must be supplied by the invoking application before issuing a DESCRIBE PRIVILEGES statement.

| Field | Data Type | Usage |
|---|---|---|
| SQLPAID | CHAR(8) | Eyecatcher and descriptor generation: 'SQLPA0' |
| SQLPABC | INTEGER | Length of the SQLPA in bytes. This will be 32 + 64*SQLPAD. |
| SQLPAN | INTEGER | Total number of object descriptions for which space is reserved in the SQLPA by the invoking application. This is the only field of the SQLPA which must be filled in before statement execution. |
| SQLPAD | INTEGER | Actual number of objects which could have been returned. |
| SQLPRES | CHAR(12) | Reserved for future use. |
| SQLPAR | structure | A repeating list of objects which match the specifications of the ON clause and host-variable. See table TABLE 3 for a description. |

TABLE 3

SQLPAR Description

| Field | Data Type | Usage |
|---|---|---|
| SQLPCOL | CHAR(18) | If the ON clause does not specify COLLECTION, this is the collection-id of the object being described, padded on the right with blanks. If the ON clause specifies COLLECTION, this field is blank. |
| SQLPOBJ | CHAR(18) | The name of an object being described, padded on the right with blanks. If an alias was used to specify the object, the alias will be used here to name the object, and SQLPALS will be set to 'Y'. |
| SQLPALS | CHAR(1) | 'Y' if the name specified in SQLAOBJ is an alias; 'N' otherwise. |
| SQLPOTP | CHAR(1) | Object type: C collection-id I index P package S snapshot T table |

TABLE 3-continued

SQLPAR Description

| Field | Data Type | Usage |
|---|---|---|
| | | V    view |
| SQLPOWN | CHAR(1) | 'Y' if the user owns, or has CONTROL privilege on the object; 'N' otherwise |
| SQLPPRVS | CHAR(25) | A string of characters describing the privileges held by the executor of the DESCRIBE PRIVILEGES command on the object being described. Valid values include: |
| | | 'Y'    the user has the privilege, but without the GRANT OPTION |
| | | 'G'    the user has the privilege with the GRANT OPTION |
| | | 'N'    the user does not have the privilege |
| | | blank    the privilege does not apply, or the field is reserved for future use. |
| | | Table 4 on page 4 shows the privileges described for each object. |

TABLE 4

SQLPPRVS definition for each object type.
Bytes 10-25 are reserved for future use. All bytes are reserved if SQLPOTP = T.
REFERENCE and UPDATE are recorded if the privilege exists on
one or more columns in a table or view.

| Byte | Collection | Package | Snapshot | Table | View |
|---|---|---|---|---|---|
| 1 | USE | DESCRIBE | SELECT | SELECT | SELECT |
| 2 | CREATE | PREPARE | Reserved | INSERT | INSERT |
| 3 | Reserved | EXECUTE | Reserved | UPDATE | UPDATE |
| 4 | DROP OBJECT | DROP STATEMENT | Reserved | DELETE | DELETE |
| 5 | DROP | DROP | DROP | DROP | DROP |
| 6 | Reserved | BIND | ALTER | ALTER | Reserved |
| 7 | Reserved | REBIND | INDEX | INDEX | Reserved |
| 8 | Reserved | COPY | Reserved | REFERENCE | Reserved |
| 9 | Reserved | Reserved | REFRESH | Reserved | Reserved |

The determination of privileges will not solely depend on GRANTS made directly to the active authorization-id. GRANTS to primary and secondary authorization-ids, GRANTS to PUBLIC, and administrative authorities held by the active authorization-id will be taken into account. The determination is functional: that is, if the user executing the DESCRIBE PRIVILEGES statement is able to currently perform the function limited by the privilege, given the values of all relevant special registers, the user will be deemed to have the privilege. For example, if the active authorization-id is the owner of an object, all flags will usually be set to "G".

Even on OS/2, which does not have the GRANT option, if a user is the owner of an object, functionally he or she has grant privileges on that object.

As a further example of the use of DESCRIBE PRIVILEGES, consider the CREATE and DROP_OBJECT privileges on a collection:

(1) In DB2 and SQL/DS, these privileges will both be set to 'N' unless the collection-id of the collection is the same as the active authorization-id, or unless the user has SYSADM or DBADM authority in DB2 or DBA authority in SQL/DS, causing these bytes to be set to 'Y'.

(2) In OS/2, these privileges will always be 'Y'.

(3) In OS/400, these privileges will vary, depending upon the user's privileges on the collection.

If the user executing the DESCRIBE PRIVILEGES statement has no privileges on an object, the object will not be listed in the SQLPA. If only a single object is specified and the user has no privileges on this object, an error will be returned.

No more than the number of SQLPAR blocks shown by SQLPAN will be returned. However, SQLPAD will always be set to show the total number of SQLPAR blocks which could have been returned.

If SQLPAN is set to zero, an SQLPA without any SQLPAR blocks will be returned. Since SQLPAD will be set, this may be used by applications to pre-determine the amount of space required for the SQLPA. However, since the calculation of privileges will need to be done twice, this may be an expensive process, and is not recommended. Application programmers should try instead to choose a reasonable value for SQLPAN, and only resubmit the DESCRIBE PRIVILEGES command when necessary.

The following exceptions apply to the DESCRIBE PRIVILEGES statement:

(1) If the contents of host-variable do not match one of the valid forms, SQLSTATE 35502 ("Invalid character in a name") is returned.

(2) If rdbname does not match the name of the local database instance, SQLSTATE 56023 ("Invalid references to a remote object") is returned.

(3) If SQLPAN specifies a negative number, or is not fully addressable, SQLSTATE 51001 ("Invalid call parameter list or control block") is returned.

(4) If a single object is specified, and the object does not exist, or if a specific collection-id is specified, and the collection does not exist, SQLSTATE 52004 ("Undefined object or constraint name") is returned.

(5) If a single object is specified, and the user executing the DESCRIBE PRIVILEGES statement has no privileges on that object, SQLSTATE 59001 ("Authorization ID does not have the privilege to perform the specified operation on the identified object") is returned.

EXAMPLE

Long ago, in a database far, far away, there were three tables that lived under the qualifier of RABBIT, and their names were FLOPSY, MOPSY and COTTONTAIL. There was also a view called VEGETABLE_GARDEN.

The user PETER was the owner of FLOPSY, and he had been granted SELECT access to MOPSY. PETER could not access VEGETABLE_GARDEN directly, but he belonged to a group called BAD_BUNNIES which had UPDATE and DELETE access to VEGITABLE-GARDEN.

PETER coded the following program in C, the language of choice for bad bunnies everywhere.

```
EXEC SQL INCLUDE SQLPA;
EXEC SQL INCLUDE SQLCA;
EXEC SQL BEGIN DECLARE SECTION;
    char hostvar [9] = 'RABBIT.*';
EXEC SQL LEND DECLARE SECTION;
main( )
{
    struct sqlpa *aa;        /* INCLUDE only defines
                                structure, not instance */
    char buffer[32+5*64];    /* Enough space for 5 SQLPAR
                                blocks */
    aa→sqlpan = 5;           /* Set SQLPAN to show room for
                                five blocks */
    EXEC SQL
        DESCRIBE PRIVILEGES ON
            TABLE :hostvar INTO :*aa;
   .
   .
   .
}
The results were:
sqlpabc                        224
sqlpan                         5
sqlpad                         3
sqlpar[0].sqlpcol              'RABBIT'
sqlpar[0].sqlpobj              'FLOPSY'
sqlpar[0].sqlpals              'N'
sqlpar[0].sqlpotp              'T'
sqlpar[0].sqlpown              'Y'
sqlpar[0].sqlpprvs[0]          'G' /* select */
sqlpar[0].sqlpprvs[1]          'G' /* insert */
sqlpar[0].sqlpprvs[2]          'G' /* update */
sqlpar[0].sqlpprvs[3]          'G' /* delete */
sqlpar[0].sqlpprvs[4]          'Y' /* drop */
        /* OS/400 would return 'G' for drop */
sqlpar[0].sqlpprvs[5]          'G' /* alter */
sqlpar[0].sqlpprvs[6]          'G' /* index */
sqlpar[0].sqlpprvs[7]          'G' /* reference */
sqlpar[0].sqlpprvs[8]          ' ' /* RESERVED */
.
.
.
sqlpar[1].sqlpcol              'RABBIT'
sqlpar[1].sqlpobj              'MOPSY'
sqlpar[1].sqlpals              'N'
sqlpar[1].sqlpotp              'T'
sqlpar[1].sqlpown              'Y'
sqlpar[1].sqlpprvs[0]          'Y' /* select */
sqlpar[1].sqlpprvs[1]          'N' /* insert */
sqlpar[1].sqlpprvs[2]          'N' /* update */
sqlpar[1].sqlpprvs[3]          'N' /* delete */
sqlpar[1].sqlpprvs[4]          'N' /* drop */
sqlpar[1].sqlpprvs[5]          'N' /* alter */
sqlpar[1].sqlpprvs[6]          'N' /* index */
sqlpar[1].sqlpprvs[7]          'N' /* reference */
sqlpar[1].sqlpprvs[8]          ' ' /* RESERVED */
.
.
.
sqlpar[2].sqlpcol              'RABBIT'
sqlpar[2].sqlpobj              'VEGETABLE_GARDEN'
sqlpar[2].sqlpals              'N'
sqlpar[2].sqlpotp              'V'
sqlpar[2].sqlpown              'N'
sqlpar[2].sqlpprvs[0]          'N' /* select */
sqlpar[2].sqlpprvs[1]          'N' /* insert */
sqlpar[2].sqlpprvs[2]          'Y' /* update */
sqlpar[2].sqlpprvs[3]          'Y' /* delete */
sqlpar[2].sqlpprvs[4]          'N' /* drop */
sqlpar[2].sqlpprvs[5]          ' ' /* alter */
sqlpar[2].sqlpprvs[6]          ' ' /* index */
sqlpar[2].sqlpprvs[7]          ' ' /* reference */
sqlpar[2].sqlpprvs[8]          ' ' /* RESERVED */
.
.
```

-continued

There has thus been shown and described a novel method for determining user access privileges on database object which fulfills all the objects and advantages sought therefor. Many changes, modification, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. A computer implemented method for determining the access privileges currently held by a database user with respect to objects in the database, said method comprising the steps of:
   (a) requesting a determination of those objects to which the given user has access privileges;
   (b) automatically determining those objects to which the user has direct access privileges;
   (c) automatically determining those objects to which the user has indirect access privileges, by means of the steps of:
      (1) automatically determining all access groups to which the user belongs; and
      (2) automatically determining those objects to which said access groups, determined in step (1) have access privileges;
   (d) automatically determining the type of access to each object to which said user has access privileges; and
   (e) automatically determining whether the access privileges for each object to which said user has access privileges may be extended to others; and
   (f) providing the access privilege information, the type of access together with the respective object, and whether the access privileges may be extended to others, to the user.

2. The method defined in claim 1, wherein step (c) further comprises the step of automatically determining those objects to which the public has access privileges.

3. The method defined in claim 1, wherein step (d) includes the step of displaying those objects to which said user has access privileges.

4. The method defined in claim 1, wherein said requesting step includes the steps of:
   (1) issuing a command to describe access privileges;
   (2) stating the type of object to be described;
   (3) stating the name of the object to be described; and
   (4) stating the name of a control block that will receive the access privileges information.

5. The method defined in claim 3, further comprising the step of displaying the associated access group together with those objects to which said access groups have access privileges.

6. The method defined in claim 1 wherein said type of access include at least one of select, insert, update, delete, drop, alter, index and reference.

7. The method defined in claim 1, wherein said method is implemented in a non-procedural computer language for use with a plurality of database products.

8. The method defined in claim 7, wherein said non-procedural language is Structured Query Language (SQL).

9. The method defined in claim 1, wherein said objects include collections, indices, packages and tables.

10. The method defined in claim 4, wherein said requesting step includes the step of specifying the type of object for which access privileges are requested.

11. The method defined in claim 1, wherein said object types include at least one of collections, indices, packages and tables.

12. A computer implemented method for determining the access privileges currently held by a database user with respect to a given object in a database, said method comprising the steps of:
   (a) requesting a determination of whether the user has access privileges to the given object;
   (b) automatically determining whether the user has direct access to the object;
   (c) automatically determining whether the user has indirect access to the object, by means of the steps of:
      (1) automatically determining all access groups to which the user belongs; an
      (2) automatically determining whether one of more of the access groups, determined in step (1) have access privileges to the object;
   (d) automatically determining the type of access privileges the user has to the object;
   (e) automatically determining whether the access privileges for the object may be extended to others; and
   (f) providing the access privilege information, the type of access, and whether the access privileges may be extended to others, to the user.

13. The method described in claim 12, wherein step (c) further comprises the step of automatically determining whether the public has access privileges to the object.

14. The method defined in claim 12, further comprising the step of displaying the respective access group or groups through which the user has access privileges to the object.

15. The method defined in claim 12, wherein said requesting step includes the steps of:
   (1) issuing a command to describe access privileges;
   (2) stating the type of the given object;
   (3) stating the name of the object; and
   (4) stating the name of a control block that will receive the access privileges information.

16. The method defined in claim 12 wherein said type of access include at least one of select, insert, update, delete, drop, alter, index and reference.

17. The method defined in claim 12, wherein said method is implemented in a non-procedural computer language for use with a plurality of database products.

18. The method defined in claim 17, wherein said non-procedural language is Structured Query Language (SQL).

19. The method defined in claim 12, wherein the given object includes one of collections, indices, packages and tables.

20. A computer system comprising a database and apparatus for determining the access privileges currently held by a database user with respect to objects in the database; said system comprising in combination:
   (a) first means for requesting a determination of those objects to which a given user has access privileges;
   (b) second means for automatically determining those objects to which the user has direct access privileges;
   (c) third means for automatically determining those objects to which the user has indirect privileges, said third means including:
      (1) fourth means for automatically determining all access groups to which the user belongs
      (2) fifth means for automatically determining those objects to which said access groups, determined by said fourth means have access privileges;
   (d) sixth means for automatically determining the type of access to each object to which said user has access privileges;
   (e) seventh means for determining whether the access privileges for each object to which said user has access privileges may be extended to others;
   (f) eight means for providing to the user, access privilege information, as requested by said first means, said type of access together with the respective object, as determined by said sixth means, and whether the access privileges for each object to which said user has access privileges may be extended to others, as determined by said seventh means.

21. The system defined in claim 20, wherein said third means further comprises means for automatically determining those objects to which the public has access privileges.

22. The system defined in claim 20, wherein said sixth means comprises means for displaying those objects to which said user has access privileges.

23. The system defined in claim 20, wherein said first means include means for:
   (1) issuing a command to describe access privileges;
   (2) stating the type of object to be described;
   (3) stating the name of the object to be described; and
   (4) stating the name of a control block that will receive the access privileges information.

24. The system defined in claim 22, further comprising means for displaying the associated access group together with those objects to which said access groups have access privileges.

25. The system defined in claim 20, wherein said type of access include at least one of select, insert, update, delete, drop, alter, index and reference.

26. The system defined in claim 20, wherein said first, second and third means execute a non-procedural computer language for use with a plurality of database products.

27. The system defined in claim 26, wherein said non-procedural language is Structured Query Language (SQL).

28. The system defined in claim 20, wherein said objects include collections, indices, packages and tables.

29. The system defined in claim 23, wherein said first means includes means for specifying the type of object for which access privileges are requested.

30. The system defined in claim 20, wherein said object types include at least one of collections, indices, packages and tables.

31. A computer system comprising a database and apparatus for determining the access privileges currently held by a database user with respect to objects in the database; said system comprising in combination:
   (a) first means for requesting a determination of whether the user has access privileges to the given object;

(b) second means for automatically determining whether the user has direct access to the object;

(c) third means for automatically determining whether the user has indirect access to the object, said third means including:

(1) fourth means for automatically determining all access groups to which the user belongs;

(2) fifth means for automatically determining whether one of more of the access groups, determined in said fourth means, have access privileges to the object;

(d) sixth means for automatically determining the type of access privileges the user has to the object;

(e) seventh means for determining whether the access privileges for the object may be extended to others;

(f) eighth means for providing to the user, access privilege to the given object information, as requested by said first means, said type of access together with the respective object, as determined by said sixth means, and whether the access privileges for each object to which said user has access privileges may be extended to others, as determined by said seventh means.

32. The system described in claim 31, wherein said third means further comprises means for automatically determining whether the public has access privileges to the object.

33. The system defined in claim 31, further comprising means for displaying the respective access group or groups through which the user has access privileges to the object.

34. The system defined in claim 31, wherein said first means include means for:

(1) issuing a command to describe access privileges;
  (2) stating the type of the given object;
  (3) stating the name of the object; and
  (4) stating the name of a control block that will receive the access privileges information.

35. The system defined in claim 31, wherein said type of access include at least one of select, insert, update, delete, drop, alter, index and reference.

36. The system defined in claim 31, wherein said first, second and third means execute a non-procedural computer language for use with a plurality of database products.

37. The system defined in claim 36, wherein said non-procedural language is Structured Query Language (SQL).

38. The system defined in claim 31, wherein the given object includes one of collections, indices, packages and tables.

* * * * *